United States Patent
Gao et al.

(10) Patent No.: US 12,181,653 B2
(45) Date of Patent: Dec. 31, 2024

(54) FLIP-TO-SIDE MOUNT AND MAGNIFIER OPTIC

(71) Applicant: ZHUHAI RUITE PHOTOELECTRIC TECHNOLOGY CO., LTD., Zhuhai (CN)

(72) Inventors: Rui Gao, Zhuhai (CN); Yunbo Hu, Zhuhai (CN); Juan Cheng, Zhuhai (CN)

(73) Assignee: ZHUHAI RUITE PHOTOELECTRIC TECHNOLOGY CO., LTD., Zhuhai (CN)

( * ) Notice: Subject to any disclaimer, the term of this patent is extended or adjusted under 35 U.S.C. 154(b) by 490 days.

(21) Appl. No.: 17/735,871

(22) Filed: May 3, 2022

(65) Prior Publication Data

US 2022/0357568 A1 Nov. 10, 2022

(30) Foreign Application Priority Data

May 8, 2021 (CN) .......................... 202110497828.2

(51) Int. Cl.
  *G02B 23/16* (2006.01)
  *F16C 11/04* (2006.01)
  *F16M 11/10* (2006.01)

(52) U.S. Cl.
  CPC .............. *G02B 23/16* (2013.01); *F16C 11/04* (2013.01); *F16M 11/10* (2013.01); *F16M 2200/022* (2013.01)

(58) Field of Classification Search
  CPC .......... G02B 7/00; G02B 7/003; G02B 7/004; G02B 7/02; G02B 7/022; G02B 7/023; G02B 7/026; G02B 7/04; G02B 23/16; G02B 23/00; F41G 11/00; F41G 11/005; F16C 11/04; F16M 11/00; F16M 2200/022; F16M 2200/024
  USPC ....... 359/399, 362, 363, 419, 420, 421, 422, 359/432, 642, 811, 813, 817, 818, 819, 359/822, 896; 42/111, 119, 124, 125, 42/148
  See application file for complete search history.

(56) References Cited

U.S. PATENT DOCUMENTS 10,627,191 B1    4/2020  Fischer et al.

FOREIGN PATENT DOCUMENTS

| CN | 106931288 A | * | 7/2017 | ............. F16M 11/10 |
| CN | 212799488 U | * | 3/2021 | |
| JP | 01087960 A | | 4/1989 | |

* cited by examiner

*Primary Examiner* — Arnel C Lavarias

(57) ABSTRACT

A flip-to-side mount of the present disclosure includes a main shaft arranged in a left-right direction; a first frame body sleeved on the main shaft which is adapted to move left and right relative to the first frame body and to rotate synchronously with the first frame body; a second frame body rotatably arranged on an end of the main shaft, an end of the second frame body being provided with a plurality of clamping grooves along a circumferential direction; a first pin arranged on the main shaft and accommodated in corresponding ones of the clamping grooves, rotation of the second frame body driving the first pin to move towards right and out of the corresponding ones; and an elastic member adapted to drive the main shaft to move towards the first frame body. The present disclosure also provides a magnifier optic.

18 Claims, 3 Drawing Sheets

FLIP-TO-SIDE MOUNT AND MAGNIFIER OPTIC

CROSS REFERENCE TO RELATED APPLICATION

This patent application claims the benefit and priority of Chinese Patent Application No. 202110497828.2 filed on May 8, 2021, the disclosure of which is incorporated by reference herein in its entirety as part of the present application.

TECHNICAL FIELD

The present disclosure relates to a mounting system, in particular to a flip-to-side mount and a magnifier optic.

BACKGROUND ART

A flip-to-side mount is usually used for mounting a lens barrel, especially a magnifier optic. By fixing the lens barrel on the flip-to-side mount, the angle and position of the lens barrel can be adjusted by taking advantage of flexible rotation of the flip-to-side mount.

During manual flip of the existing mount, it is difficult to accurately control a flip angle of the mount in manual way, and thus, for an imaging device such as lens barrel, large errors will often be caused, which will affect the observation effect. Therefore, the existing mount has disadvantages of poor flip accuracy, difficult positioning and so on.

SUMMARY

One object of the present disclosure is at least addressing one of the technical problems existing in the prior art. For this, the present disclosure provides a flip-to-side mount in one aspect, and provides a magnifier optic in another aspect.

A flip-to-side mount according to a first aspect of the present disclosure includes: a main shaft, arranged in a left-right direction; a first frame body, sleeved on the main shaft which is configured to move left and right relative to the first frame body and rotate synchronously with the first frame body; a second frame body, rotatably arranged on an end of the main shaft, an end of the second frame body being provided with a plurality of clamping grooves along a circumferential direction; a first pin, arranged on the main shaft and accommodated in corresponding ones of the clamping grooves, rotation of the second frame body driving the first pin to move towards a right and out of the corresponding clamping grooves; and an elastic member, configured to drive the main shaft to move towards the first frame body.

The flip-to-side mount according to the embodiment of the present disclosure has at least the following beneficial effects. In the disclosure, the first pin is driven to be out of the clamping groove by the rotation of the second frame body; after the second frame body rotates to a certain angle, and under the action of the elastic member the first pin is driven to engage with a next clamping groove, so as to realize the control of the rotation angle. The present disclosure has high positioning accuracy, accurate rotation angle, and can realize fixed angle adjustment by manpower without additional angle measuring equipment, thereby greatly saving the equipment cost and simplifying the operation process in the flip process.

According to some embodiments of the present disclosure, the first frame body includes: a shaft sleeve, connected with the main shaft; and a fixing seat, having one side sleeved on the shaft sleeve and another side provided with a fixing structure.

According to some embodiments of the present disclosure, the flip-to-side mount further includes a second pin, where one of the main shaft and the shaft sleeve is provided with a sliding groove along an axial direction, another of the main shaft and the shaft sleeve is provided with a pin hole adapted to the second pin, along a radial direction; one end of the second pin is arranged in the pin hole, and an other end of the second pin is inserted into the sliding groove.

According to some embodiments of the present disclosure, the second frame body includes: a sleeve, sleeved on the shaft sleeve, and configured to rotate relative to the shaft sleeve, the clamping grooves being provided on an end of the sleeve; and a mounting seat, a side of which is fixedly connected with the sleeve, another side of which is provided with a mounting structure.

According to some embodiments of the present disclosure, the flip-to-side mount further includes third pins, where one of the shaft sleeve and the sleeve is provided with a positioning groove along a circumferential direction, another one of the shaft sleeve and the sleeve is provided with positioning holes along a radial direction; an end of each third pin is arranged in corresponding one of the positioning holes, and another end of the third pin is inserted into the positioning groove.

According to some embodiments of the present disclosure, four clamping grooves are arranged on the sleeve along the circumferential direction, and an angle formed between two adjacent clamping grooves is 90°.

According to some embodiments of the present disclosure, a middle portion of the first pin is fixed on the main shaft, two ends of the first pin extend away from the main shaft and are configured to be accommodated in two of the four clamping grooves respectively.

According to some embodiments of the present disclosure, the clamping grooves are V-shaped.

According to some embodiments of the present disclosure, the elastic member is a tension spring and wound around the main shaft; two ends of the elastic member are connected with the first frame body and the main shaft respectively.

According to an embodiment of a second aspect of the present disclosure, a magnifier optic includes: any one of the flip-to-side mounts described above; a lens barrel, fixed on the second frame body; and a base, on which the first frame body is arranged.

The magnifier optic according to the embodiment of the present disclosure has at least the following beneficial effects: the magnifier optic of the embodiment can control the rotation of the lens barrel and the first frame body to a fixed angle only by rotating the lens barrel through external force, which ensures the rotation accuracy of the lens barrel and improves the convenience in the adjustment process.

Additional aspects and advantages of the disclosure will be given in part in the following description, and some will become apparent from the following description, or learned through the practice of the disclosure.

BRIEF DESCRIPTION OF THE DRAWINGS

The above and/or additional aspects and advantages of the present disclosure will be apparent and readily understand from the description of the embodiments in combination with the following drawings, wherein.

Figure 1:
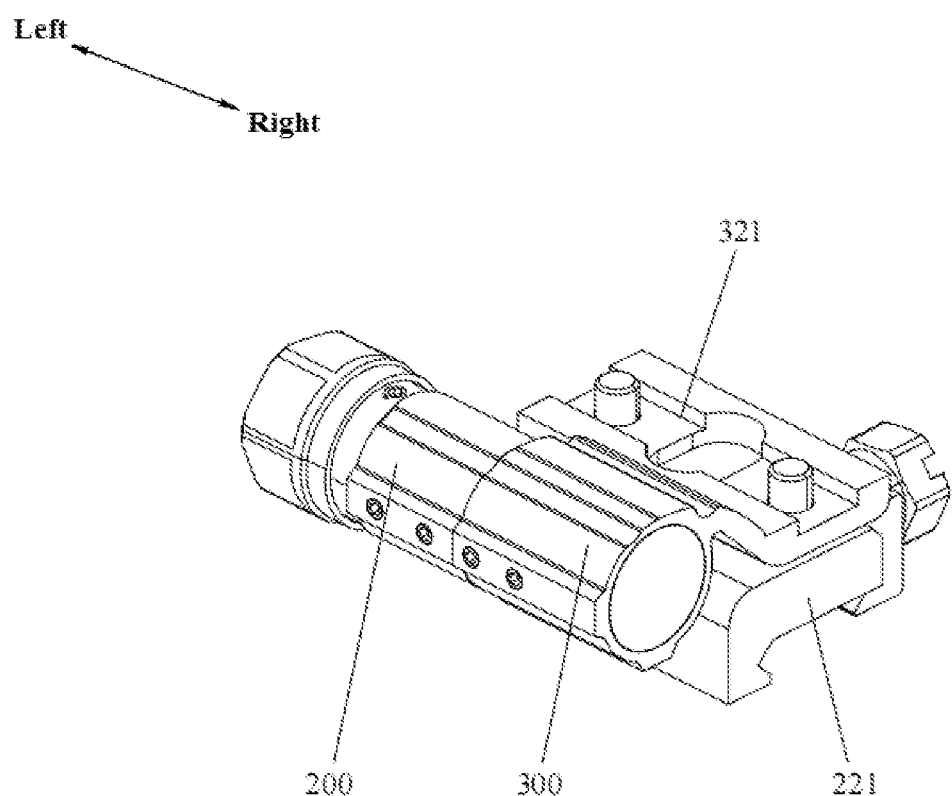
FIG. 1 is a schematic diagram of an overall structure of a flip-to-side mount according to the present disclosure.

List of reference numerals: main shaft 100; sliding groove 101; first frame body 200; shaft sleeve 210; positioning groove 211; pin hole 212; fixing seat 220; fixing structure 221; second frame body 300; clamping groove 301; sleeve 310; positioning hole 311; mounting seat 320; installation structure 321; first pin 400; elastic member 500; second pin 600; third pin 700.

DETAILED DESCRIPTION OF THE EMBODIMENTS

An embodiment of the present disclosure is described in detail below, and an example of the embodiment is shown in the drawings, in which the same or similar reference numerals throughout the figures denote the same or similar elements or elements with the same or similar functions. The embodiments described below with reference to the accompanying drawings are exemplary and are only used to explain the disclosure and cannot be understood as limitations to the disclosure.

In the description of the disclosure, it should be understood that the orientation or position relationship indicated by the terms "above", "below", "front", "rear", "left", "right", "transverse", "longitudinal", "vertical" and so on is based on the orientation or position relationship shown in the accompanying drawings, only for convenience of describing the disclosure and simplifying the description, rather than indicating or implying that the device or element must have a specific orientation, or be constructed and operated in a specific orientation, it cannot be understood as a limitation to the present disclosure. In addition, a feature defined with "first" or "second" may explicitly or implicitly indicate that there are one or more features. In the description of the disclosure, unless otherwise specified, "multiple" means two or more.

In the description of the disclosure, it should be noted that unless otherwise clearly specified and limited, the terms "install", "set" and "connect" should be understood in a broad sense. For example, they may be fixed connection, removable connection or integrated connection. mechanical connection or electrical connection, and may be connected directly or indirectly through an intermediate medium, even they may be the communication between the two elements. For those skilled in the art, the specific meaning of the above terms in the disclosure can be understood in certain context.

Figure 2:
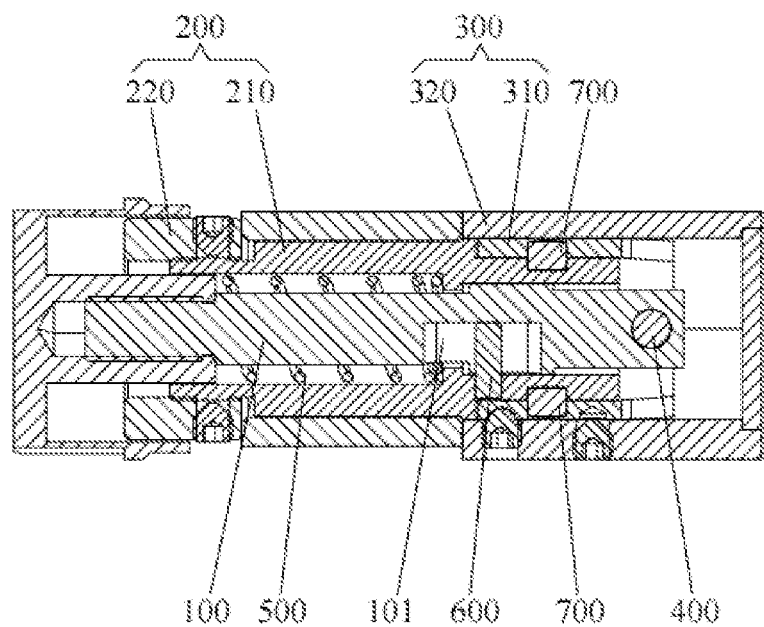
FIG. 2 is a section view of the flip-to-side mount according to the present disclosure.
Figure 3:
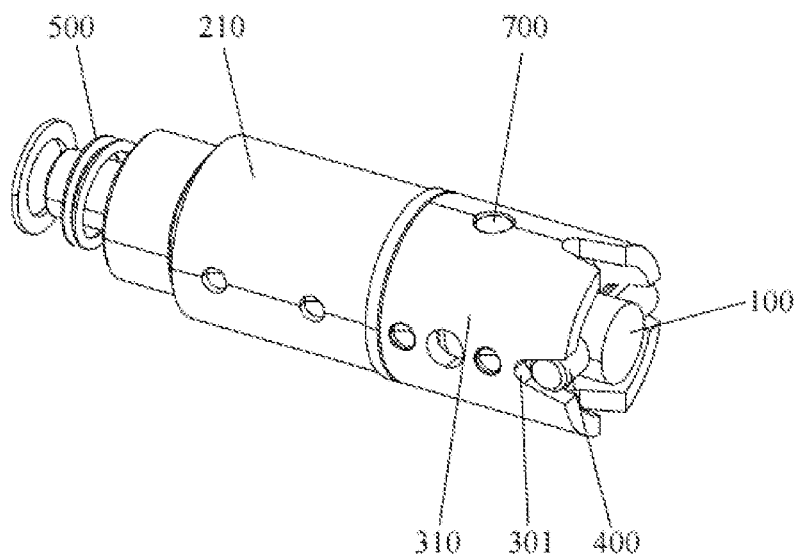
FIG. 3 is a schematic diagram of an internal structure of the flip-to-side mount according to the present disclosure.

Referring to FIG. 1, FIG. 2 and FIG. 3, the flip-to-side mount according to one embodiment of the first aspect of the present disclosure includes a main shaft 100, a first frame body 200, a second frame body 300, a first pin 400 and an elastic member 500. The main shaft 100 is arranged in a left-right direction. The first frame body 200 which is sleeved on a left portion of the main shaft 100, the main shaft 100 is adapted to move left and right relative to the first frame body 200 and to rotate synchronously with the first frame body 200. In the embodiment, the first frame body 200 functions to install and fix the whole flip-to-side mount. The second frame body 300 is rotatably arranged on a right portion of the main shaft 100, a right end of the second frame body 300 is provided with a plurality of clamping grooves 301 along a circumferential direction, and groove openings of the clamping grooves 301 face towards the right. The second frame body 300 is sleeved on the main shaft 100, and the clamping grooves 301 are evenly distributed in the second frame body 300 along the circumferential direction of the main shaft 100. In the embodiment, the second frame body 300 functions to install the lens barrel, an angle of the lens barrel is adjusted through rotation of the second frame body 300 relative to the main shaft 100 and the first frame body 200. The first pin 400 is vertically arranged in the main shaft 100 and accommodated in the clamping groove 301. The main shaft 100 is provided with an insertion hole along a radial direction, the first pin 400 is inserted into the insertion hole, and the other end of the first pin is arranged towards a clamping groove 301 and can abut against an inner wall of the clamping groove 301. The elastic member 500 is adapted to drive the main shaft 100 to move in a direction towards the first frame body 200.

In the present disclosure, when the second frame body 300 rotates around the main shaft 100, a contact force between the clamping groove 301 and the first pin 400 due to the fact that the clamping groove 301 abuts against the first pin 400 and rotates relative to the first pin 400, drives the first pin 400 and the main shaft 100 to move to the right against the elastic force of the elastic member 500. At the same time, the first pin 400 leaves the clamping groove 301 and abuts against the second frame body 300 under the elastic force of the elastic member 500. When the second frame body 300 rotates to a certain angle, a next clamping groove 301 adjacent to the first clamping groove 301 rotates to a position of the first pin 400, and the first pin 400 comes into contact with the next clamping groove 301. Under the action of the elastic member 500, the first pin 400 and the main shaft 100 move to the left, so that the first pin 400 is accommodated in the next clamping groove 301. Thus, one angular rotation of the second frame body 300 for driving the lens barrel to rotate by a fixed angle is completed. Further, in order to push the first pin 400 out of the clamping groove 301, a greater external force needs to be applied to the second frame body 300. Therefore, in a process of manual rotation, whether the first pin 400 is contained in the clamping groove 301 can be perceived by magnitude of the force with which the second frame body 300 is rotated. In the above description, "certain angle" refers to an angle formed between two adjacent clamping grooves 301. Therefore, it can be understood that in one rotation process, the rotation angle of the second frame body 300 is equal to the angle formed between two adjacent clamping grooves 301. Therefore, through setting the angle formed between the two adjacent clamping grooves 301, the rotation angle which may be 30°, 45°, 60° and so on in each rotation process can be controlled. Corresponding to the rotation angle of 30°, 45° or 60°, the number of clamping grooves 301 may also be 12, 8 or 6. The size of the angle between the two adjacent clamping grooves 301 and the number of clamping grooves 301 can be set otherwise according to actual needs of angle adjustment, the present disclosure does not make specific definition.

The flip-to-side mount according to the embodiment of the present disclosure has at least the following beneficial effects. In the disclosure, the first pin is driven to move out of the clamping groove by the rotation of the second frame body; after the first pin moves out of the clamping groove, the second frame body continues to rotate to a certain angle, and under the action of the elastic member, the first pin is driven to engage with a next clamping groove on the second frame body, so as to realize the control of the rotation angle. The present disclosure has high positioning accuracy, accurate rotation angle, and can implement fixed angle adjustment in a manual way without additional angle measuring equipment, thereby greatly saving the equipment cost and simplifying the operation procedure in the flip process.

In some embodiments of the disclosure, referring to FIG. 1 and FIG. 2, the first frame body 200 includes a shaft sleeve 210 and a fixing seat 220. An inner diameter of the shaft sleeve 210 is adapted to the main shaft 100, and is sleeved on a left portion of the main shaft 100. One side of the fixing seat 220 is sleeved on the shaft sleeve 210 and fixed with the shaft sleeve 210 through bolts, and the other side of the fixing seat 220 is provided with a fixing structure 221 configured for connecting with external compounds. In this embodiment, the fixing structure 221 is in a form of groove structure with an opening facing downwards, and can be fixed on a matched slide rail through the groove structure. The fixing structure 221 can also be other installation structures such as bolt holes and bolts. The first frame body 200 is configured to fix the flip-to-side mount through the fixing seat 220, and connect the main shaft 100 with the shaft sleeve 210, so as to ensure the stability and compactness of the structure of the flip-to-side mount.

Figure 4:
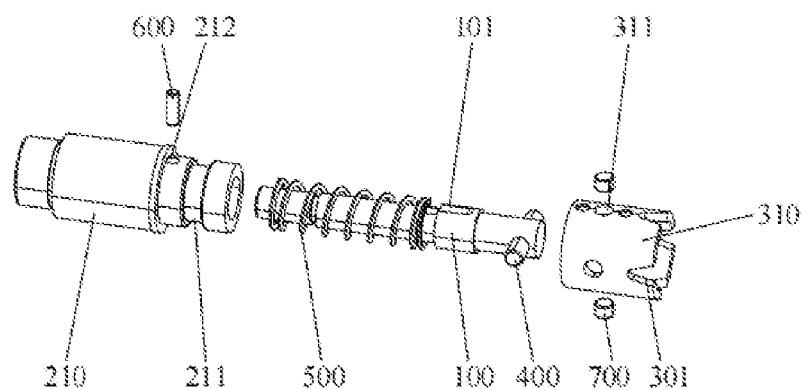
FIG. 4 is an exploded view of FIG. 3.

In some embodiments, referring to FIG. 2 and FIG. 4, the present disclosure also includes a second pin 600. The main shaft 100 is provided with a sliding groove101 along an axial direction, and the sliding groove101 is arranged along the left-right direction inside the shaft sleeve 210. The second pin 600 is cylindrical, the diameter of the second pin 600 is adapted to a groove width of the sliding groove101. The shaft sleeve 210 is provided with a pin hole 212 along a radial direction, and the second pin 600 is arranged vertically, one end of the second pin 600 is arranged in the pin hole 212, and the other end thereof is inserted into the sliding groove101 and abuts against two side walls of the sliding groove101. With arrangement of the second pin 600 and the sliding groove101, upon rotation of the main shaft 100, the second pin 600 abuts against the inner wall of the sliding groove101 so as to drive the first frame body 200 to rotate synchronously, thereby ensuring the relative fixation between the first frame body 200 and the main shaft 100 in the circumferential direction. Further, when the main shaft 100 moves left and right along the axial direction, the second pin 600 slides relative to the sliding groove101, to allow the main shaft 100 to move flexibly within a certain range. The sliding groove101 also has a limiting function. The above "certain range" is equivalent to a length of the sliding groove101. The sliding groove101 can cooperate with the second pin 600 to limit a moving distance of the main shaft 100 in the left and right directions, so as to prevent the main shaft 100 from separating from the shaft sleeve 210.

It should be noted that the second pin functions to achieve the synchronous rotation of the first frame body and the main shaft, and ensure that the main shaft can move axially relative to the first frame body. The assembly method of the second pin is not limited to the method in the above embodiment. Alternatively, a pin hole may be arranged on the main shaft along the radial direction, and a sliding groove may be arranged in the inner side of the sleeve along the axial direction. One end of the second pin is matched with the pin hole and inserted into the pin hole, and a diameter of the other end is matched with a width of the sliding groove and inserted into the sliding groove, so as to realize the assembly connection of the second pin.

In some embodiments of the disclosure, referring to FIG. 1, FIG. 2 and FIG. 3, the second frame body 300 includes a sleeve 310 and a mounting seat 320. The sleeve 310 is sleeved on a right portion of the shaft sleeve 210, the sleeve 310 is configured for rotating relative to the shaft sleeve 210, a right end of the sleeve 310 extends away from the shaft sleeve 210, and the clamping grooves 301 are evenly arranged at the right end of the sleeve 310 along the circumferential direction of the sleeve 310. One side of the mounting seat 320 is sleeved on the sleeve 310 and connected with the sleeve 310 through locking bolts, and the other side thereof is provided with a mounting structure 321 configured for installing external device, which may be a lens barrel in this embodiment. The mounting structure 321 includes a rectangular mounting plate and bolts arranged on the rectangular mounting plate. The lens barrel is fixedly mounted to the mounting structure by attaching the rectangular mounting plate to a side of the lens barrel and connecting the rectangular mounting plate and the lens barrel with the bolts.

In some embodiments, referring to FIG. 2 and FIG. 4, the present disclosure further includes third pins 700. The shaft sleeve 210 is provided with a positioning groove 211 along the circumferential direction, the width of the positioning groove 211 is adapted to the diameter of the third pin 700. The sleeve 310 is provided with positioning holes 311 adapted to the third pins 700 along the radial direction, and one end of each third pin 700 is inserted into corresponding one of the positioning holes 311, the other end thereof is inserted into the positioning groove 211 and abuts against the left and right side walls of the positioning groove 211. In this embodiment, the second frame body 300 drives the shaft sleeve 210 to rotate together, the third pin 700 and the limit groove limit the rotation track of the shaft sleeve 210 and prevent the shaft sleeve 210 from separating from the sleeve 310, thereby ensuring relative fixation between the shaft sleeve 210 and the sleeve 310 in the axial direction.

It should be noted that the third pin functions to ensure the rotation of the shaft sleeve relative to the sleeve and the axial fixation of the shaft sleeve and the sleeve. The assembly method of the third pin is not limited to the assembly method in the above embodiment. Alternatively, a positioning groove may be arranged on the inner side of the sleeve along the circumferential direction, positioning holes may be arranged in the shaft sleeve along the radial direction, and one end of each third pin is inserted into corresponding positioning hole, the other end thereof extends into the positioning groove to realize assembly.

Furthermore, the connection mode between the shaft sleeve and the sleeve is also not limited to the connection mode through the third pin disclosed in the above embodiment. Alternatively, the inner side of the sleeve may be provided with a positioning protrusion along the circumferential direction, the outer side of the shaft sleeve may be provided with a positioning groove along the circumferential direction, and positioning protrusions may be clamped in the positioning groove, so as to realize the assembly of the shaft sleeve and the sleeve.

In some embodiments of the disclosure, referring to FIG. 3, four clamping grooves 301 are arranged along the circumferential direction of the sleeve 310, and the angle formed between the two adjacent clamping grooves 301 is 90°. In this embodiment, by providing four clamping grooves 301, the rotation angle of the second frame body 300 in each flip process is controlled to be 90°, thereby realizing the accurate control of the flip angle.

In some embodiments of the disclosure, referring to FIG. 3, a middle portion of the first pin 400 is fixed in the main shaft 100, where the main shaft 100 is provided with a through hole along the radial direction, the first pin 400 is inserted into the through hole, and two ends of the first pin 400 extend away from the main shaft 100 and are configured for being accommodated in two clamping grooves 301 respectively.

In some embodiments of the disclosure, referring to FIG. 3, the clamping groove 301 is a V-shaped groove, the opening of the clamping groove 301 faces to the right, the groove surfaces of the V-shaped groove are of an inclined structure. The force applied to the first pin 400 during the rotation of the sleeve 310 can be converted into, through the groove surfaces with the inclined structure, a thrust in the horizontal direction, so as to push the first pin 400 out of the clamping groove 301, which has the advantages of allowing the flexible operation of the flip-to-side mount and reducing the resistance in the flip process.

It should be noted that the clamping groove is characterized in that the action force caused by the rotation of the clamping groove is transformed into the thrust on the first pin through the inclined groove surfaces. The specific structure of the groove is not limited to the V-shaped groove structure as illustrated in this embodiment, but may also be other clamping groove structures with inclined groove surfaces, such as semicircular arc groove, trapezoidal groove.

In some embodiments, referring to FIG. 2 and FIG. 3, the elastic member 500 is a tension spring, the elastic member 500 is wound around the main shaft 100, and two ends of the elastic member 500 are connected with the first frame body 200 and the main shaft 100 respectively. The tension of the tension spring drives the main shaft 100 to move towards the first frame body 200, so as to realize reset and ensure the engagement between the first pin 400 and the clamping groove 301.

The magnifier optic according to the embodiment of the second aspect of the disclosure includes any of the above flip-to-side mounts, and also includes a lens barrel and a base. The lens barrel is fixed on the second frame body. In this embodiment, the second frame body is provided with a rectangular mounting plate and bolts, and furthermore sides of the rectangular mounting plate and the lens barrel are provided with corresponding bolt holes respectively, the bolts are inserted through the rectangular mounting plate and connect with the lens barrel to fix the lens barrel. The first frame body is arranged on the base, the base is in a shape of a guide rail, the first frame body is provided with an open groove structure adapted to the base, and the first frame body is arranged on the base through the open groove structure, so as to realize the fixed assembly of the whole flip-to-side mount.

The magnifier optic according to the embodiment of the disclosure has at least the following beneficial effects: in the magnifier optic of the embodiment, the lens barrel and the first frame body can be controlled to rotate to a fixed angle, only by rotating the lens barrel through external force, which ensures the rotation accuracy of the lens barrel and improves the convenience in the adjustment process.

In the description of this specification, the term "some embodiments" means that the specific features, structures, materials or characteristics described in connection with the embodiments or examples are included in at least one embodiment or example of the present disclosure. In this specification, the exemplary expression of the above terms does not necessarily refer to the same embodiment or example. Furthermore, the specific features, structures, materials or characteristics described may be combined in a suitable manner in any one or more embodiments or examples.

Although the embodiments of the disclosure have been shown and described, those skilled in the art can understand that these embodiments can be changed, modified, replaced and varied without departing from the principle and purpose of the disclosure, and the scope of the present disclosure is limited by the claims and their equivalents.

What is claimed is:

1. A flip-to-side mount, comprising:
   a main shaft, arranged in a left-right direction;
   a first frame body, sleeved on the main shaft which is configured to move left and right relative to the first frame body and rotate synchronously with the first frame body;
   a second frame body, rotatably arranged on an end of the main shaft, an end of the second frame body being provided with a plurality of clamping grooves along a circumferential direction;
   a first pin, arranged on the main shaft and accommodated in corresponding ones of the clamping grooves, rotation of the second frame body driving the first pin to move towards a right and out of the corresponding clamping grooves; and
   an elastic member, configured to drive the main shaft to move towards the first frame body.

2. The flip-to-side mount according to claim 1, wherein the first frame body comprises:
   a shaft sleeve, connected with the main shaft; and
   a fixing seat, having one side sleeved on the shaft sleeve and another side provided with a fixing structure.

3. The flip-to-side mount according to claim 2, further comprises a second pin, one of the main shaft and the shaft sleeve is provided with a sliding groove along an axial direction, another of the main shaft and the shaft sleeve is provided with a pin hole adapted to the second pin, along a radial direction; one end of the second pin is arranged in the pin hole, and another end of the second pin is inserted into the sliding groove.

4. The flip-to-side mount according to claim 2, wherein the second frame body comprises:
   a sleeve, sleeved on the shaft sleeve, and configured to rotate relative to the shaft sleeve, the clamping grooves being provided on an end of the sleeve; and
   a mounting seat, a side of which is fixedly connected with the sleeve, another side of which is provided with a mounting structure.

5. The flip-to-side mount according to claim 4, further comprising third pins, wherein one of the shaft sleeve and the sleeve is provided with a positioning groove along a circumferential direction, another one of the shaft sleeve and the sleeve is provided with positioning holes along a radial direction; an end of each third pin is arranged in corresponding one of the positioning holes, and another end of the third pin is inserted into the positioning groove.

6. The flip-to-side mount according to claim 1, wherein four clamping grooves are arranged on the sleeve along the circumferential direction, and an angle formed between two adjacent clamping grooves is 90°.

7. The flip-to-side mount according to claim 6, wherein a middle portion of the first pin is fixed on the main shaft, two ends of the first pin extend away from the main shaft and are configured to be accommodated in two of the four clamping grooves respectively.

8. The flip-to-side mount according to claim 1, wherein the clamping grooves are V-shaped.

9. The flip-to-side mount according to claim 1, wherein the elastic member is a tension spring and wound around the main shaft; two ends of the elastic member are connected with the first frame body and the main shaft respectively.

10. A magnifier optic, comprising
a flip-to-side mount, wherein the flip-to-side mount comprises a main shaft, arranged in a left-right direction; a first frame body, sleeved on the main shaft which is configured to move left and right relative to the first frame body and rotate synchronously with the first frame body; a second frame body, rotatably arranged on an end of the main shaft, an end of the second frame body being provided with a plurality of clamping grooves along a circumferential direction; a first pin, arranged on the main shaft and accommodated in corresponding ones of the clamping grooves, rotation of the second frame body driving the first pin to move towards a right and out of the corresponding clamping grooves; and an elastic member, configured to drive the main shaft to move towards the first frame body;
a lens barrel, fixed on the second frame body; and
a base, on which the first frame body is arranged.

11. The magnifier optic according to claim 10, wherein the first frame body comprises:
a shaft sleeve, connected with the main shaft; and
a fixing seat, having one side sleeved on the shaft sleeve and another side provided with a fixing structure.

12. The magnifier optic according to claim 11, further comprises a second pin, one of the main shaft and the shaft sleeve is provided with a sliding groove along an axial direction, another of the main shaft and the shaft sleeve is provided with a pin hole adapted to the second pin, along a radial direction; one end of the second pin is arranged in the pin hole, and an other end of the second pin is inserted into the sliding groove.

13. The magnifier optic according to claim 11, wherein the second frame body comprises:
a sleeve, sleeved on the shaft sleeve, and configured to rotate relative to the shaft sleeve, the clamping grooves being provided on an end of the sleeve; and
a mounting seat, a side of which is fixedly connected with the sleeve, another side of which is provided with a mounting structure.

14. The magnifier optic according to claim 13, further comprising third pins, wherein one of the shaft sleeve and the sleeve is provided with a positioning groove along a circumferential direction, another one of the shaft sleeve and the sleeve is provided with positioning holes along a radial direction; an end of each third pin is arranged in corresponding one of the positioning holes, and another end of the third pin is inserted into the positioning groove.

15. The magnifier optic according to claim 10, wherein four clamping grooves are arranged on the sleeve along the circumferential direction, and an angle formed between two adjacent clamping grooves is 90°.

16. The magnifier optic according to claim 15, wherein a middle portion of the first pin is fixed on the main shaft, two ends of the first pin extend away from the main shaft and are configured to be accommodated in two of the four clamping grooves respectively.

17. The magnifier optic according to claim 10, wherein the clamping grooves are V-shaped.

18. The magnifier optic according to claim 10, wherein the elastic member is a tension spring and wound around the main shaft; two ends of the elastic member are connected with the first frame body and the main shaft respectively.

* * * * *